United States Patent
Han et al.

(10) Patent No.: US 10,341,920 B2
(45) Date of Patent: *Jul. 2, 2019

(54) MULTITIER WIRELESS DATA DISTRIBUTION

(71) Applicant: Fortinet, Inc., Sunnyvale, CA (US)

(72) Inventors: Sung-Wook Han, Sunnyvale, CA (US); Martin Ostrowski, Mountain View, CA (US); Vaduvur Bharghavan, Morgan Hill, CA (US)

(73) Assignee: Fortinet, INc, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/783,987

(22) Filed: Oct. 13, 2017

(65) Prior Publication Data
US 2018/0152864 A1 May 31, 2018

Related U.S. Application Data

(63) Continuation of application No. 11/894,598, filed on Aug. 20, 2007, now Pat. No. 9,838,911.

(51) Int. Cl.
*H04W 36/16* (2009.01)
*H04W 28/08* (2009.01)
(Continued)

(52) U.S. Cl.
CPC ........... *H04W 36/165* (2013.01); *H04L 45/54* (2013.01); *H04L 47/125* (2013.01); *H04W 28/08* (2013.01);
(Continued)

(58) Field of Classification Search
CPC ............. H04W 36/00; H04W 36/0005; H04W 36/0011; H04W 36/0022; H04W 36/08; H04W 36/10; H04W 36/12; H04W 36/165; H04W 36/22; H04W 36/38; H04W 28/08; H04W 28/16; H04W 84/12; H04L 47/125; H04L 45/54
See application file for complete search history.

(56) References Cited

U.S. PATENT DOCUMENTS 5,487,065 A 1/1996 Acampora et al.
5,528,583 A 6/1996 Acampora et al.
(Continued)

*Primary Examiner* — Joshua Kading
(74) *Attorney, Agent, or Firm* — Law Office of Dorian Cartwright; Dorian Cartwright

(57) ABSTRACT

Data distribution between mobile stations and external data paths is assigned to a new set of devices, distribution points. Each distribution point is independently coupled to mobile stations, also assigned to access points. Control elements operate to control the distribution points separately from the access points. Each access point maintains a substantially stateless link with each distribution point for which the two share a mobile station. Access points might exchange data with any one or more distribution points concurrently. Access points thus obtain greater bandwidth connectivity to external data paths. Mobile stations transfer between access points and transfer between distribution points independently. This has the effect that bandwidth connectivity between distribution points and external data paths have no particular requirement for VLAN separation. Mobile stations may roam among multiple Internet protocol subnets.

20 Claims, 2 Drawing Sheets

(51) Int. Cl.
*H04W 36/10* (2009.01)
*H04W 36/08* (2009.01)
*H04W 36/00* (2009.01)
*H04W 36/38* (2009.01)
*H04L 12/741* (2013.01)
*H04L 12/803* (2013.01)
*H04W 28/16* (2009.01)
*H04W 36/12* (2009.01)
*H04W 84/12* (2009.01)

(52) U.S. Cl.
CPC ........... *H04W 28/16* (2013.01); *H04W 36/00* (2013.01); *H04W 36/0011* (2013.01); *H04W 36/08* (2013.01); *H04W 36/10* (2013.01); *H04W 36/12* (2013.01); *H04W 36/38* (2013.01); *H04W 84/12* (2013.01)

(56) References Cited

U.S. PATENT DOCUMENTS

| | | |
|---|---|---|
| 6,760,318 B1 | 7/2004 | Bims |
| 6,788,658 B1 | 9/2004 | Bims |
| 6,839,038 B2 | 1/2005 | Weinstein |
| 6,894,649 B2 | 5/2005 | Ostervall |
| 6,954,177 B2 | 10/2005 | Channabassapa et al. |
| 7,403,504 B2 | 7/2008 | Sawabe et al. |
| 9,838,911 B1 * | 12/2017 | Han ........ H04W 28/08 |
| 2002/0090951 A1 | 7/2002 | Kanagawa |
| 2005/0272430 A1 | 12/2005 | Griebling |
| 2006/0154609 A1 | 7/2006 | Takano |
| 2007/0109980 A1 | 5/2007 | Awater et al. |
| 2007/0115906 A1 | 5/2007 | Gao et al. |
| 2007/0189220 A1 | 8/2007 | Oberle et al. |
| 2007/0189243 A1 | 8/2007 | Wang et al. |
| 2007/0250596 A1 | 10/2007 | Baugher |
| 2007/0253326 A1 | 11/2007 | Saha et al. |
| 2008/0026754 A1 | 1/2008 | Chang |
| 2008/0031212 A1 | 2/2008 | Ogura |
| 2008/0123529 A1 | 5/2008 | Lee et al. |
| 2008/0227457 A1 * | 9/2008 | Wu ........ H04W 36/38 455/437 |
| 2009/0190550 A1 | 7/2009 | Giustina et al. |

* cited by examiner

MULTITIER WIRELESS DATA DISTRIBUTION

RELATED APPLICATION DATA

This application claims the benefit as a continuation of U.S. application Ser. No. 11/894,598, entitled Multitier Wireless Data Distribution and filed on Aug. 20, 2007, now issued U.S. Pat. No. 9,838,911, the contents of which is hereby incorporated in its entirety.

BACKGROUND

Some wireless systems include mobile stations (MS), access points (AP), and a form of control element (CD). Mobile stations communicate with access points, which in turn provide a virtual tunnel to a switching element (SD), which can also provide data transfer between access points, or from access points to external data paths. A first known problem in systems of this type is that if the data rate between mobile stations and access points is too high, the control element might not have sufficient capability to exchange data with external data paths at data rates being demanded by the aggregate of the mobile stations. A second known problem is that if the number of mobile stations is too high, individual control elements might become overloaded with the number of mobile stations they must manage.

One known solution is to simply provide more control elements, with the effect that each control element has less demand placed upon it, and with the effect that each control element need not have the full capability to exchange data with external data paths, as noted above. This known solution has the effect that the ratio of access points to control elements is reduced proportionate to the bandwidth ratio; i.e., increased bandwidth between the mobile stations and the access points means that there is a lower ratio of access points to control elements, with the effect that coordination among access points becomes more difficult as each control elements manages fewer access points. This also has the effect that it becomes difficult to perform security functions with uniform rules, as the increased number of control elements coordinate with each other. This also has the effect that it becomes difficult for mobile stations to roam between control elements, particularly when those control elements are allocated to separate Internet protocol subnets; i.e., the reduced ratio of access points to control elements reduces the ability of mobile stations to roam between certain distinct sets of access points.

DESCRIPTION

Nature of the Description

Read this application in its most general form. This includes, without limitation:

References to specific structures or techniques include alternative or more general structures or techniques, especially when discussing aspects of the invention, or how the invention might be made or used.

References to "preferred" structures or techniques generally mean that the inventor contemplates using those structures are techniques, and think they are best for the intended application. This does not exclude other structures or techniques for the invention, and does not mean that the preferred structures or techniques would necessarily be preferred in all circumstances.

References to 1st contemplated causes or effects for some implementations do not preclude other causes or effects that might occur in other implementations, even if completely contrary, where circumstances would indicate that the 1st contemplated causes or effects would not be as determinative of the structures or techniques to be selected for actual use.

References to 1st reasons for using particular structures or techniques do not preclude other reasons or other structures or techniques, even if completely contrary, where circumstances would indicate that the 1st structures or techniques are not as compelling. The invention includes those other reasons or other structures or techniques, especially where circumstances would indicate they would achieve the same effect or purpose as the 1st reasons, structures, or techniques.

Overview of the Description

A function of data distribution between mobile stations and external data paths is separated from the control element and the access points, instead being assigned to a new set of devices, distribution points (DP). Each distribution point might be independently coupled to one or more mobile stations, each of which is also assigned to one or more access points. Control elements operate to control the distribution points separately from the access points. Each access point maintains a substantially stateless link with each distribution point for which that particular access point and that particular distribution point share a mobile station.

This has the effect that access points might exchange data with any distribution point, or with more than one distribution point at a time, with the effect that access points obtain greater bandwidth connectivity to external data paths. This also has the effect that mobile stations may be transferred between access points without change in their associated distribution point (with the effect of making handoff of mobile stations between access points simpler and less disruptive), and may be transferred between distribution points without change in their associated access point (with the effect of making failover and load sharing among distribution points transparent to the mobile station). Being able to transfer mobile stations between access points without change in their associated distribution point has the effect that there is no particular need for mobile station handoff between distinct control elements. Not needing to transfer mobile stations between distribution points, and being able to advertise the same wireless service (SSID) on multiple distinct distribution points, has the effect that it is possible to attach multiple distinct VLAN's, or more generally, multiple distinct subnets, to the same SSID at distinct distribution points.

Multiple distinct control elements can make use of a common set of distribution points. This has the effect that the system might include multiple distinct control elements, each managing its own set of access points (and the mobile stations assigned thereto), while those multiple distinct control elements might cause mobile stations to exchange data with any distribution point, or with more than one distribution point at a time. This has the effect that multiple distinct control elements might be introduced into the system to handle a larger number of access points, or for other reasons.

Terms and Phrases

Read this application with the following terms and phrases in their most general form. The general meaning of each of these terms or phrases is illustrative, not in any way limiting.

BRIEF SUMMARY

Figure 1:
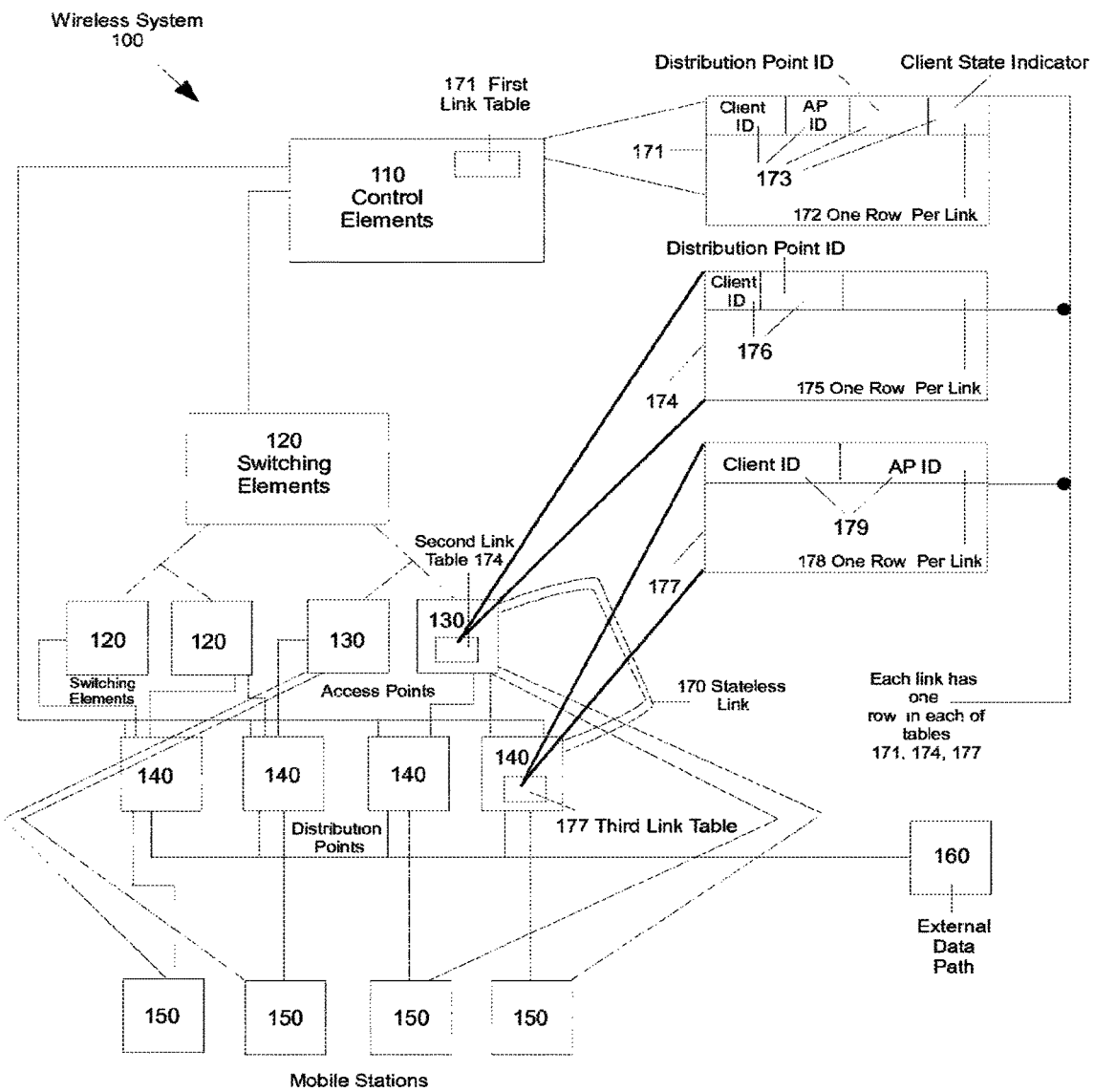
FIG. 1 is a block diagram illustrating a wireless system, according to a first embodiment.

The phrase "access points", and variants thereof, generally refers to any device capable of being coupled to one or more mobile stations and capable of being coupled to a non-wireless medium. Access points might be coupled directly to a non-wireless medium, e.g., using copper wire or other signal-carrying media, or might be coupled indirectly, e.g., using wireless communication to 1 other devices (possible other access points) which are themselves coupled, directly or indirectly, to a non-wireless medium. Although this application provides greater detail regarding embodiments in which access points primarily 4 operate using an IEEE 802.11 protocol, there is no particular reason to limit any part of this application in this regard.

The phrase "bandwidth", and variants thereof, generally refers to any form of communication capacity, such as for example measured using Shannon information theory. Although this application provides greater detail regarding embodiments in which bandwidth is primarily a concern between control elements and external data paths, or between access points and external data paths, there is no particular reason to limit any part of this application in this regard.

The phrase "control element", and variants thereof, generally refers to any device coupled to one or more access points and capable of coordinating the activities of those access points. Although this application provides greater detail regarding embodiments in which a control element associates mobile stations with access points, and in which that control element determines (at least in part) how those access points respond to those mobile stations, there is no particular reason to limit any part of this application in this regard.

The phrase "data distribution", and variants thereof, generally refers to any technique for transmitting, receiving, exchanging, or maintaining information. Although this application provides greater detail regarding embodiments in which data distribution is primarily between mobile stations and external data paths, there is no particular reason to limit any part of this application in this regard.

The phrase "distribution points", and variants thereof, generally refers to any device having a capability for performing a function of data distribution between access points and external data paths. Although this application provides greater detail regarding embodiments in which distribution points are separate devices, there is no particular reason to limit any part of this application in this regard.

The phrase "external data paths", and variants thereof, generally refers to any means for exchanging data between devices logically within the wireless system and devices logically outside the wireless system, e.g., a backplane, a computer network, a LAN or WAN, an enterprise network, an internet or intranet, or any other means for achieving a substantially similar purpose. Although this application provides greater detail regarding embodiments in which external data paths include a backplane or a LAN, there is no particular reason to limit any part of this application in this regard.

The phrase "mobile station", and variants thereof, generally refers to any device in a wireless system that has the capability of being moved. Although this application provides greater detail regarding embodiments in which mobile stations include cellular telephones, portable computers, or other radio equipment, there is no particular reason to limit any part of this application in this regard.

The phrase "security functions", and variants thereof, generally refers to any technique for enforcing policy rules or limiting access to resources. Although this application provides greater detail regarding embodiments in which security functions include protocols overlaid on an IEEE 802.11 standard, there is no particular reason to limit any part of this application in this regard.

The phrase "stateless link", and variants thereof, generally refers to a protocol between devices in which neither need maintain any, or relatively little, information about the most recent operations conducting using that link. Although this application provides greater detail regarding embodiments in which a stateless link is primarily used for data distribution, there is no particular reason to limit any part of this application in this regard. (In some embodiments, where a communication link between access points and distribution points is encrypted, each access point to distribution point link includes at least some state for maintaining an encrypted communication path, but this amount of state is relatively small.)

The phrase "subnet roaming", and variants thereof, generally refers to any capability of mobile stations to access different internet protocol ("IP protocol") communication subnets at distinct times. Although this application provides greater detail regarding embodiments as described below, there is no particular reason to limit any part of this application in this regard.

The phrase "switching element", and variants thereof, generally refers to any device capable of exchanging data among devices in a system in which there is more than one path on which that data could be transmitted or received. Although this application provides greater detail regarding embodiments in which switching elements are primarily used for data transfer among access points, there is no particular reason to limit any part of this application in this regard.

The phrase "wireless system", and variants thereof, generally refers to any communication or computing system in which data are transmitted, received, or maintained using a wireless medium. Although this application provides greater detail regarding embodiments in which wireless systems use an IEEE 802.11 protocol, there is no particular reason to limit any part of this application in this regard.

FIGURES AND TEXT

FIG. 1

A FIG. 1 shows a block diagram of a first system according to this application.

A wireless system 100 includes elements as shown in the FIG. 1, including at least:

110 at least one control element
120 a set of switching elements

- 130 a set of access points
- 140 a set of distribution points
- 150 a set of mobile stations
- 160 at least one external data path In one embodiment, the control element 110 might perform functions as described in a related application Ser. No. 11/715,287, filed Mar. 7, 2007, now issued U.S. Pat. No. 7,826,426, hereby incorporated by reference as if fully set forth herein. In such embodiments, the control element 110 communicates with each access point 130 to control their responses to mobile stations 150. This has the effect that all access points 130 appear substantially identical to mobile stations 150, with the effect that each mobile station 150 operating using an IEEE 802.11 protocol proceeds as if there were only a single access point 130. Components can be implemented with physical medium information interpretable by a computer device.

As part of the wireless system 100, either due to the technique by which the control element 110 communicates with each access point 130 to control their responses to mobile stations 150, or due to a technique for exchanging data between and among access points 130, or due to a technique for exchanging data between and among mobile stations 150, it might become desirable to operate one or 12 more switches between and among access points 130. In one embodiment, the control element 110 is coupled to one or more switching elements 120, which are each coupled to two or more of (either) distinct switching elements 120 (or) distinct access points 130. Thus, a switching element 120 might operate as a switch between or among two or more access points 130, between or among two or more other switching elements 120, or between or among at least one switching element 120 and at least one access point 130.

A set of distribution points 140 are each coupled to the control element 110, to one or more switching elements 120 or access points 130, and to external data paths 160. The control element 110 communicates with each distribution point 140 to control their responses to access points 130 and to control their responses to mobile stations 150.

When a mobile station 150 attempts to exchange data with an external data path 160 (or with a device coupled to that particular external data path 160), the control element 110 performs several tasks.

The control element 110 associates a distribution point 140 with that particular mobile station 150, with the effect that the particular distribution point 140 couples the particular mobile station 150 with the particular external data path 160.

The control element 110 informs a selected access point 130 (to which the mobile station had been assigned) of the assignment of that distribution point 140 to that mobile station 150 and informs that distribution point 140 of the assignment of that access point 130 to that mobile station 150. This has the effect of establishing a stateless link 170 between the access point 130 and the distribution point 140.

The stateless link 170 is represented at the control element 110 by a first link table 171, including one row 172 for each such stateless link 170, each row including fields 173 representing each of: a client identifier such as its MAC address, an access point 130 identifier, a distribution point 140 identifier, and a client state indicator.

The stateless link 170 is represented at the access point 130 by a second link table 174, including one row 175 for each such stateless link 170, each row including fields 176 representing each of: a client identifier such as its MAC address, and a corresponding a distribution point 140 identifier representing the other end of the stateless link 170.

The stateless link 170 is represented at the distribution point 140 by a third link table 177, including one row 178 for each such stateless link 170, each row including fields 178 representing each of: a client identifier such as its MAC address, and a corresponding a access point 140 identifier representing the other end of the stateless link 170.

This has the effect that the mobile station 150 can exchange information with the external data path 160.

To send information to the external data path 160, the mobile station 150 sends that information to its associated access point 130. The access point 130 sends that information to the distribution point 140 associated with the mobile station 150. The distribution point 140 sends that information to the external data path 160.

To receive information from the external data path 160, the mobile station 150 receives that information from its associated access point 130. The access point 130 receives that information from the distribution point 140 associated with the mobile station 150. The distribution point 140 receives that information from the external data path 160.

As described below in other and further detail, the stateless link 170 might be broken and reestablished from time to time.

Access points 130 might exchange data with any distribution point 140, or with more than one distribution point 140 at a time, with the effect that access points 130 obtain greater bandwidth connectivity to external data paths 160.

The control element 110 might transfer a mobile station 150 from a first access point 130 to a second access point 130 without change in the distribution point 140 associated with that mobile station 150 (with the effect of making handoff of mobile stations 150 between access points 130 simpler and less disruptive). The control element 110 might transfer a mobile station 150 from a first distribution point 140 without change in their associated access point 130 (with the effect of making failover and load sharing among distribution points 140 transparent to the mobile station 150).

FIG. 2

Figure 2:
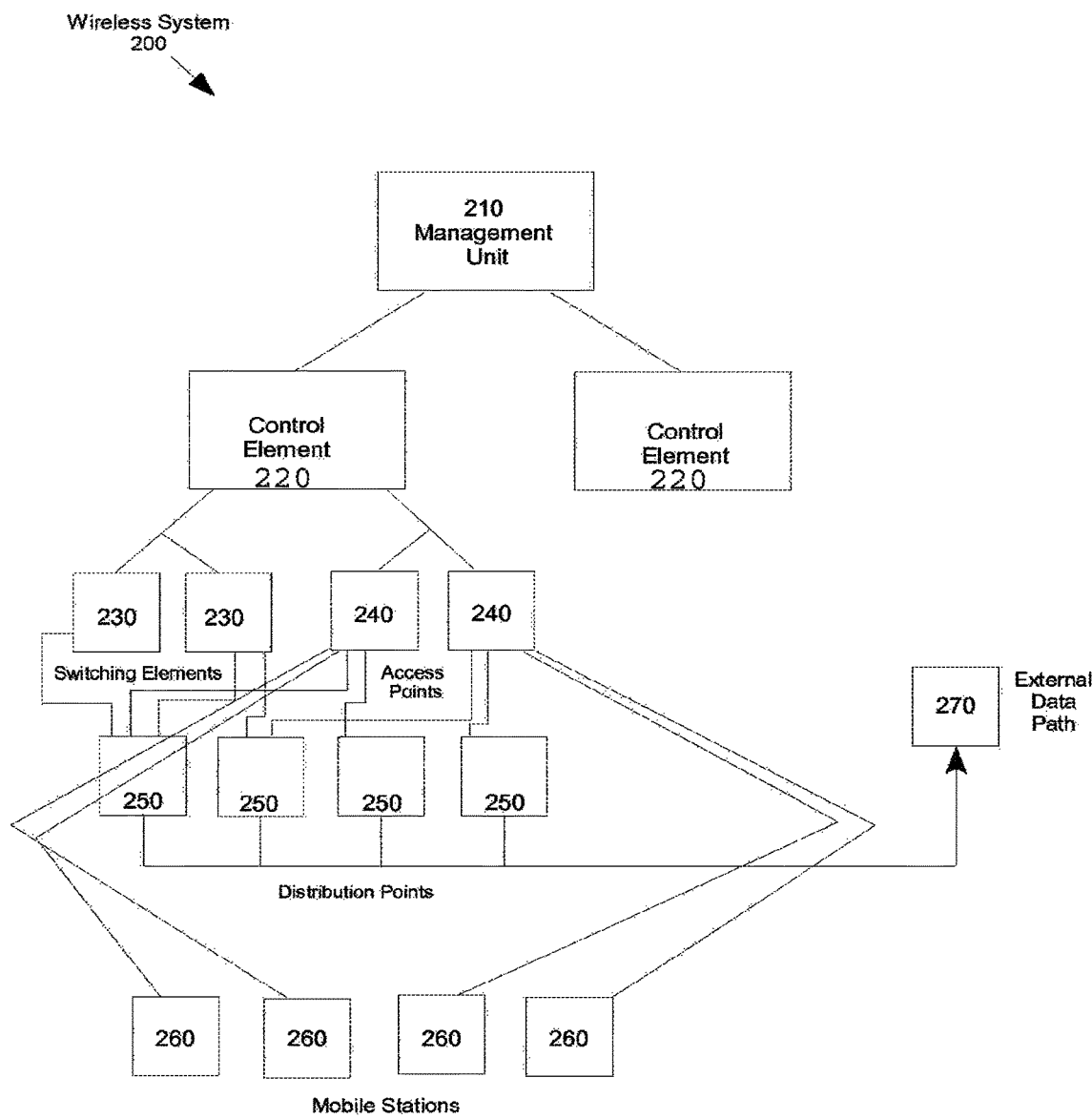
FIG. 2 is a block diagram illustrating a wireless system, according to a second embodiment.

A FIG. 2 shows a block diagram of a second system according to this application.

A wireless system 100 includes elements as shown in the FIG. 2, including at least:
- 210 at least one management unit
- 220 a set of control elements
- 230 a set of switching elements
- 240 a set of access points
- 250 a set of distribution points
- 260 a set of mobile stations
- 270 at least one external data path In one embodiment, the management unit 210 might perform at least some of the functions allocated to the control element 120 of the FIG. 1. For example, in one embodiment, the management unit 210 might perform functions as described in a related application Ser. No. 11/715,287, filed Mar. 7, 2007, now issued U.S. Pat. No. 7,826,426, hereby incorporated by reference as if fully set forth herein. In such embodiments, the management unit 210 communicates with each control element 220 to manage policy rules and security functions for those control elements 220. This has the effect that each that uniform policy rules and security functions can be enforced by the control elements 220 in response to the management unit 210.

In one embodiment, the control element 220 might perform functions as described above with respect to the FIG.

1, with modifications to account for those functions performed by the management unit 210, as described above.

In one embodiment, the switching elements 230, access points 240, distribution points 250, and external data paths 270 are coupled in like manner as in the FIG. 1.

This has the effect that the control element 220 communicates with each access point 130 to control its interaction with distribution points 140 and mobile stations 150. Similarly, this has the effect that the control element 220 communicates with each distribution point 140 to control its interaction with access points 130 and mobile stations 150. Similarly, this has the effect that all distribution points 140 appear substantially identical to mobile stations 150, with the effect that each mobile station 150 operating using an IEEE 802.11 protocol proceeds as if there were only a single distribution point 140.

The management unit 210 performs the function of setting uniform policy rules and security functions, and directing those distribution points 250 to implement those uniform policy rules and security functions. When a mobile station 260 attempts to send a message using its associated distribution point 250, that associated distribution point 250 performs firewall and QoS rules as directed by the management unit 210, to determine whether that message is to be normally permitted, permitted with certain restrictions (such as QoS restrictions, or alternatively QoS priority), or whether that message is to be normally prohibited.

This has the effect that, the control element 220 can concern itself exclusively with connectivity and routing aspects of the system 200, while leaving policy rules and security functions to be performed by the management unit 210. In like manner as separating out the distribution function from the control element 220, and leaving those distillation functions to be reform by distribution points 250, separating out policy rules and security functions from the control element 220 has the effect that the control element 220 can concentrate its efforts and be more responsive to mobile units 260.

Alternative Embodiments

After reading this application, those skilled in the art will recognize that the invention has wide applicability, and is not limited to the embodiments described herein.

The invention claimed is:

1. A computer-implemented method in a centralized control element for managing connections between wireless mobile devices in a local area network and external paths to a wide area network, comprising:
   operating one or more access points in response to the centralized control element that manages connections between mobile devices and external paths, the access points providing accessibility for the mobile devices to a wireless data network, and the centralized control element assigning a first access point to a mobile device;
   operating two or more distribution points in response to the centralized control element that manages associations between the distribution points and the mobile devices, the distribution points providing distinct external data paths for the access points, and the centralized control element assigning a first distribution point to the mobile device, wherein each of the access points is connected to each of the distribution points;
   maintaining substantially statelessly a first communication link between the first access point and the first distribution point having the commonly-assigned mobile device responsive to the centralized control element, wherein data exchanged between the mobile device and an external data path travels along the first communication link; and
   moving the mobile device from the first distribution point to a second distribution point and replacing the first communication link with a second communication link between the first access point and the second distribution point while continuing to maintain the assignment between the mobile device and the first access point responsive to the centralized control element:
      wherein the move between distribution points is independent of any moves between access points, and wherein data exchanged between the mobile device and second external data path travels along the second communication link after the move between distribution points,
      and wherein the centralized control element, in a manner that is substantially transparent to the mobile device, transfers the mobile device from the first distribution point to the second distribution point, and updates the assignment of the second distribution point to the mobile station.

2. The method of claim 1, further comprising:
   subsequently replacing the second communication link with a third communication link between the second distribution point and the second access point while continuing to maintain the assignment between the mobile device and the second distribution point responsive to the centralized control element, wherein data exchanged between the mobile device and the external data path travels along the third communication link after the move between the distribution points.

3. The method of claim 2 wherein moving the mobile device from the first distribution point to the second distribution point is responsive to a load balancing operation by the centralized control element.

4. The method of claim 1, further comprising:
   transferring the mobile device from the first access point to a second access point by the centralized control element in a manner that the transfer is substantially transparent to the mobile device, wherein the first and second access points advertise the same SSID.

5. The method of claim 4, wherein the mobile device is operating using an IEEE 802.11 protocol.

6. The method of claim 1, wherein maintaining substantially statelessly the first communication link comprises:
   maintaining a first link table at the centralized control element comprising a row for each stateless link managed by the centralized control element, a first row comprising a unique identifier of the mobile device, a unique identifier of the first access point and a unique identifier of the first distribution point.

7. The method of claim 6, further comprising:
   updating the first link table to replace the unique identifier of the first access point with a unique identifier of a second access point.

8. The method of claim 6, wherein maintaining substantially statelessly the first communication link comprises:
   sending to the first access point the unique identifier of the mobile device and the unique identifier of the first distribution point for storage in a second link table at the first access point comprising a row for each stateless link implemented by the first access point, a first row comprising the unique identifier of the mobile device, and the unique identifier of the first distribution point.

9. The method of claim 6, wherein maintaining substantially statelessly the first communication link comprises:
sending to the first distribution point the unique identifier of the mobile device and the unique identifier of the first access point for storage in a third link table at the first distribution point comprising a row for each stateless link implemented by the first distribution point, a first row comprising the unique identifier of the mobile device, and the unique identifier of the first access point.

10. The method of claim 1, further comprising:
transferring the mobile device from the first access point to a second access point with a change by the centralized control element in a manner that the first and second access points appear as a single access point to the mobile device.

11. A physical medium including information interpretable by a computer device that, when executed by a processor, performs a method for managing connection between wireless mobile devices in a local area network and external paths to a wide area network, the method comprising the steps of:
operating one or more access points in response to the centralized control element that manages connections between mobile devices and external paths, the access points providing accessibility for the mobile devices to a wireless data network, and the centralized control element assigning a first access point to a mobile device;
operating two or more distribution points in response to the centralized control element that manages associations between the distribution points and the mobile devices, the distribution points providing distinct external data paths for the access points, and the centralized control element assigning a first distribution point to the mobile device, wherein each of the access points is connected to each of the distribution points;
maintaining substantially statelessly a first communication link between the first access point and the first distribution point having the commonly-assigned mobile device responsive to the centralized control element, wherein data exchanged between the mobile device and an external data path travels along the first communication link; and
moving the mobile device from the first distribution point to a second distribution point and replacing the first communication link with a second communication link between the first access point and the second distribution point while continuing to maintain the assignment between the mobile device and the first access point responsive to the centralized control element:
wherein the move between distribution points is independent of any moves between access points, and wherein data exchanged between the mobile device and an alternative external data path travels along the second communication link after the move between distribution points,
and wherein the centralized control element, in a manner that is substantially transparent to the mobile device, transfers the mobile device from the first distribution point to the second distribution point, and updates the assignment of the second distribution point to the mobile station.

12. The physical medium of claim 11, wherein the method further comprises:
subsequently replacing the second communication link with a third communication link between the second distribution point and the second access point while continuing to maintain the assignment between the mobile device and the second distribution point responsive to the centralized control element, wherein data exchanged between the mobile device and the external data path travels along the third communication link after the move between the distribution points.

13. The physical medium of claim 12, wherein moving the mobile device from the first distribution point to the second distribution point is responsive to a load balancing operation by the centralized control element.

14. The physical medium of claim 11, further comprising:
transferring the mobile device from the first access point to a second access point by the centralized control element in a manner that the transfer is substantially transparent to the mobile device, wherein the first and second access points advertise the same SSID.

15. The physical medium of claim 14, wherein the mobile device is operating using an IEEE 802.11 protocol.

16. The physical medium of claim 11, wherein the step of maintaining substantially statelessly the first communication link comprises of the method further comprises:
maintaining a first link table at the centralized control element comprising a row for each stateless link managed by the centralized control element, a first row comprising a unique identifier of the mobile device, a unique identifier of the first access point and a unique identifier of the first distribution point.

17. The physical medium of claim 16, further comprising:
updating the first link table to replace the unique identifier of the first access point with a unique identifier of a second access point.

18. The physical medium of claim 16, wherein the step of maintaining substantially statelessly the first communication link of the method further comprises:
sending to the first access point the unique identifier of the mobile device and the unique identifier of the first distribution point for storage in a second link table at the first access point comprising a row for each stateless link implemented by the first access point, a first row comprising the unique identifier of the mobile device, and the unique identifier of the first distribution point.

19. The physical medium of claim 16, wherein the step of maintaining substantially statelessly the first communication link of the method further comprises:
sending to the first distribution point the unique identifier of the mobile device and the unique identifier of the first access point for storage in a third link table at the first distribution point comprising a row for each stateless link implemented by the first distribution point, a first row comprising the unique identifier of the mobile device, and the unique identifier of the first access point.

20. The physical medium of claim 11, further comprising:
transferring the mobile device from the first access point to a second access point with a change by the centralized control element in a manner that the first and second access points appear as a single access point to the mobile device.

* * * * *